United States Patent [19]

Ayers

[11] Patent Number: 5,046,443
[45] Date of Patent: Sep. 10, 1991

[54] STEEL-FIBERGLASS FLOAT

[75] Inventor: Ray R. Ayers, Houston, Tex.

[73] Assignee: Shell Oil Company, Houston, Tex.

[21] Appl. No.: 904,428

[22] Filed: Sep. 8, 1986

[51] Int. Cl.[5] .............................................. H04R 1/02
[52] U.S. Cl. ..................................... 114/244; 367/173
[58] Field of Search ............................ 114/355–357, 114/61, 264, 123, 270, 244, 253, 254, 245, 246; 367/16, 20, 23, 141, 173; 181/115, 118, 120, 198

[56] References Cited

U.S. PATENT DOCUMENTS

| 3,760,439 | 9/1973 | Swenson | 114/356 |
| 3,871,043 | 3/1975 | Davidson et al. | 114/356 |
| 3,966,171 | 6/1976 | Hale | 114/244 |
| 4,055,138 | 10/1977 | Klein | 114/244 |
| 4,307,457 | 12/1981 | Wills | 114/270 |
| 4,361,103 | 11/1982 | Willat | 114/246 |
| 4,516,517 | 5/1985 | Ayers | 114/244 |
| 4,556,003 | 12/1985 | Prade | 114/357 |

FOREIGN PATENT DOCUMENTS 2152216 7/1985 United Kingdom .............. 114/244

Primary Examiner—Galen Barefoot
Assistant Examiner—Stephen P. Avila

[57] ABSTRACT

A seismic float is made in two parts—an upper foam-filled fiberglass hull and a lower steel hull, thereby resulting in a more stable float of reduced dimensions.

5 Claims, 1 Drawing Sheet

STEEL-FIBERGLASS FLOAT

BACKGROUND OF THE INVENTION

This invention pertains to buoyant structures having particular usefulness in the field of geophysical prospecting. In seismic surveying conducted in connection with offshore oil and gas exploration, it is the practice of the art to have buoyant structures a supporting apparatus such as air gun seismic sources.

The prior art has utilized seismic floats of various materials and dimensions. Thus, large steel floats many feet in length and weighing hundreds or even thousands of pounds and requiring many men to launch such floats from a boat, have been employed. Not only are these metal floats large in size, excessive in weight, high in cost and subject to corrosion which reduces the life expectancy of the floats, but if such a float is damaged, it will sink and thereby disrupt operations and cause delays in scheduled offshore activities. In seeking to overcome this problem of the art in utilizing steel floats, the prior art has provided seismic floats which are relatively light in weight, such as the fiberglass float disclosed in U.S. Pat. No. 3,469,551 or the styrofoam float disclosed in U.S. Pat. No. 3,089,453. While such floats are indeed light in weight, they are not, however, capable of withstanding rough handling. For example, if an air-operative explosive unit is coupled to such a float, the force of the blast may very well destroy the float or at least substantially limit its useful life. Accordingly, not only is there a need in the art for a seismic float which is of reduced weight and thereby easier to handle and to tow than conventional steel seismic floats, but it is also desirable that such seismic floats be relatively rugged and not susceptible to damage either from handling or from air-operative explosive units coupled to the float.

SUMMARY OF THE INVENTION

The present invention pertains to a lightweight seismic float which is useful in offshore operations, such a seismic float being characterized by having an upper hull of at least one lightweight, buoyant member and a lower metallic hull.

DESCRIPTION OF PREFERRED EMBODIMENTS

Figure 1:
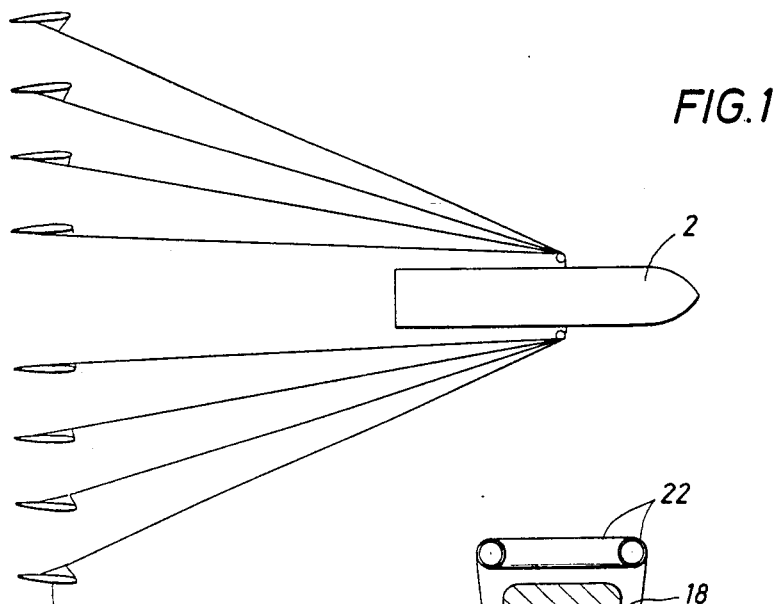
FIG. 1 is a plan view of the invention showing how a plurality of seismic subarrays are towed by a vessel.

As shown in FIG. 1, it is feasible to tow a large number of seismic subarrays, such as subarray 1, which are spread well apart outboard of vessel 2 in order to accommodate the large number of subarrays. This creates a better seismic source, not only due to a better defined three-dimensional figure of oil bearing strata, but also due to reduced interference between the subarrays. As above mentioned, it is desirable that the subarrays be light in weight to reduce handling problems and be durable to withstand blasts from air-operative explosive units below the floats of the seismic subarrays. It is even more desirable that the floats be easily handled and maneuvered in view of the large number of floats which are to be towed behind the tow vessel.

Figure 2:
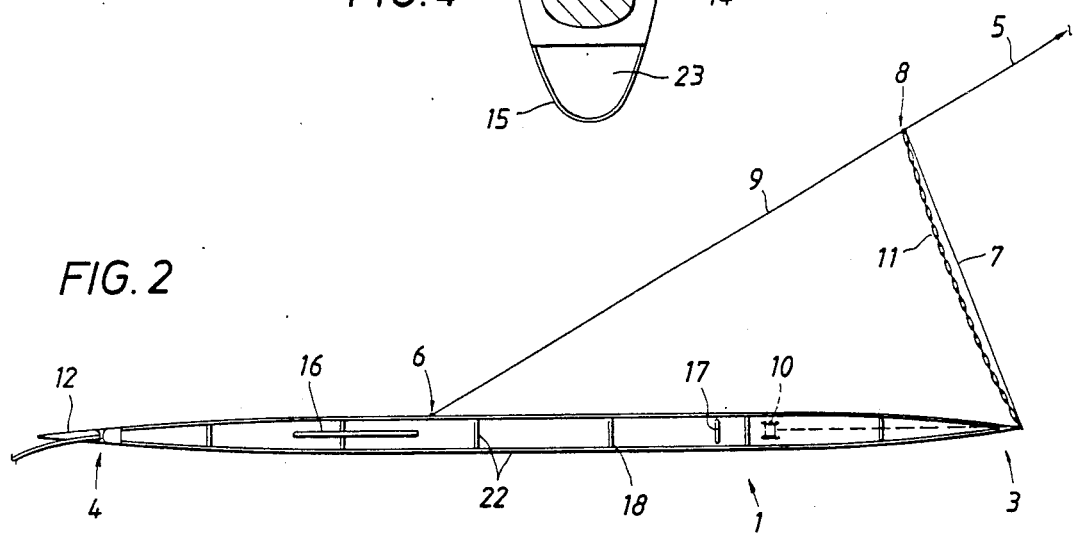
FIG. 2 is a plan view of a single seismic subarray.

As more particularly shown in FIG. 2, a seismic subarray 1 having a bow 3 and stern 4 is towed outboard a vessel via a towline 5, which may also function as a faired umbilical cable. The towline or umbilical cable 5 terminates just aft of midship of the float 1 at termination point 6. A cable 7, preferably wire rope, extends from the bow 3 of float 1 and attaches to the umbilical cable 5, such that the distance between the attachment point 8 and the termination point 6 of the umbilical is generally the same as the distance from the termination point 6 to the bow 3 and the float 1. Cable 7 is hereinafter termed the foreleg of the bridle which also includes an aft leg 9 which extends from attachment point 8 to termination point 6. A winch 10, just inside the float 1, is provided and has the ability to shorten or lengthen foreleg 7, thereby changing the offset distance of the float from the tow vessel 2 while the float is under tow. Preferably, the winch 10 is powered by an hydraulic motor (not shown) which brings in the foreleg 7 of the bridle cable to allow recovery of the float or pays out foreleg 7 to allow depolyment of the float. The maximum letout of the foreleg 7 of the bridle is limited by safety chain 11 or other connection means of a predetermined length in order to preset the bridle arrangement. It would be expected to use a preset safety chain length for each float in a multiple float array, and the chain length on each float would be different depending upon its desired position behind the tow vessel. Accordingly, the winch 10 preferably would only be used to pull the bridle in and let it out during deployment and recovery.

A secondary use of the hydraulic bridle winch 10 is to assist rudder 12 in turning float 1 as the tow vessel 2 turns. Turning the float with the bridle is feasible when the float is positioned on the far outboard side of a turn by the vessel and is broadside to where the vessel is attempting to turn. By this means, it is possible to generate exorbitant drag force on the float and turn the float around more to facing the vessel 2. Inasmuch as it is necessary to generate hydraulic power for the winch 10, it is feasible to divert some of the hydraulic power and use it for control of the rudder 12. The rudder on the float is turned in the same direction as the rudder for the tow vessel, i.e. as the rudder of the tow vessel is turned clockwise, so is the float rudder turned clockwise. Suitable control mechanisms known in the art may be used to control and coordinate such turning operations.

Figure 3:
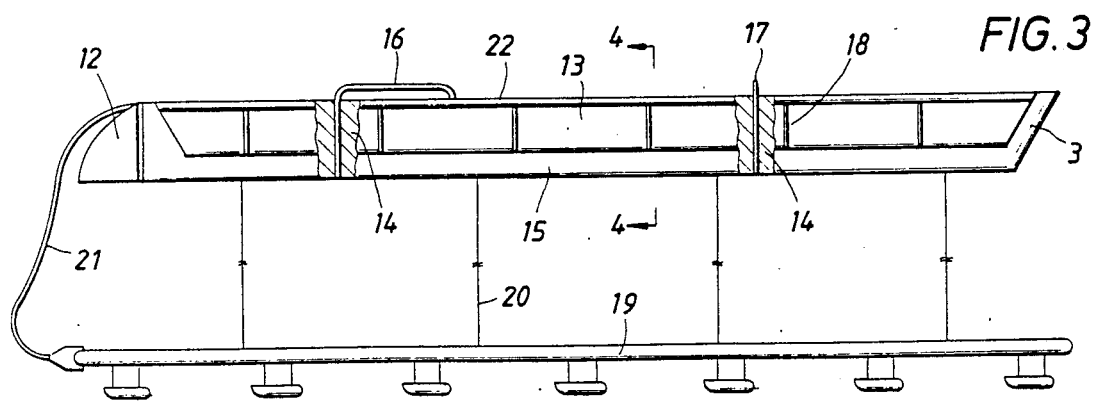
FIG. 3 is a side elevational view of the subarray of FIG. 2.

FIG. 3 more particularly reveals the use of an upper hull of a lightweight buoyant material 13. This may, for example, be a fiberglass outer shell and contain a foam 14 therewithin as shown by the cutaway portions in FIG. 3, or the upper hull may be formed in situ on top of the lower hull 15 which is preferably a strong material such as steel. Inasmuch as the upper hull is of a relatively lightweight, low strength material, the landing rails 16 and 17 (used to pick up the subarray) preferably extend down to the bottom of the hull 15 and are attached thereto, for example, by welding. Preferably, the rudder 12 is of steel or other strong material and the forward part of the bow 3 is also of steel or other strong material. Optionally, the bottom 15 may be attached to the buoyant upper structure by means of frames 18 which extend from bottom 15 to truss 22. Otherwise, the float has a conventional gun support beam 19 which extends beneath the float and is attached by connection means such as lines 20 to the float and at the forward end is attached by an air line 21, which extends within the umbilical cable 5 to the tow vessel 2. The advantage of an upper hull of foam plastic or other lightweight material is that the float is more stable in the water since it has a low center of gravity compared to all-steel floats.

Figure 4:
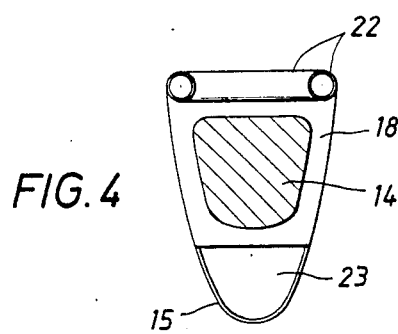
FIG. 4 is a cross-sectional view of the subarray of FIGS. 2 and 3.

FIG. 4 provides a sectional view of the subarray of FIGS. 2 and 3 and shows how frame 18 connects truss 22 with bottom 15. Foam 14 is provided in the upper part of the subarray while bottom 15 may be gas-filled or contain gas-filled bags 23. This type of structure substantially reduces the weight of the subarray and permits use of more steel in bottom 15 which bears the majority of the impact from shocks emanating from the seismic guns. Impacts along the sides of the subarray are primarily glancing blows, so that the sides need not be as strong as the bottom of the subarray. This permits a more strategic use of steel in the subarray of this invention than is now the case in the prior art.

Although a preferred embodiment of the invention has been shown and described, it will be appreciated by those skilled in the art that many modifications may be made without departing from the spirit of the invention.

What is claimed is:

1. A seismic float comprising:
   an upper hull which is foam-filled fiberglass contained within a truss; and
   a metallic lower hull attached to the upper hull.

2. A method for fabricating a seismic float comprising:
   constructing an upper hull of a lightweight buoyant member which is foam-filled fiberglass within a truss; and
   constructing a metallic lower hull which is attached to the upper hull.

3. A seismic float comprising:
   an upper hull of at least one lightweight, buoyant member; and
   a metallic lower hull containing gas-filled bags.

4. A seismic float comprising:
   an upper hull of foam-filled fiberglass; and
   a lower hull of steel.

5. A method for fabricating a seismic float comprising:
   constructing an upper hull of at least one lightweight, buoyant member;
   constructing a metallic lower hull which is attached to the upper hull; and
   filling the lower hull with gas-filled bags.

* * * * *